United States Patent
Ogawa et al.

[11] Patent Number: 5,887,173
[45] Date of Patent: *Mar. 23, 1999

[54] PROGRAM PROCESSING TO FACILITATE PROGRAM EDITING

[75] Inventors: Yasuyuki Ogawa, Tokyo; Tsuneaki Kadosawa, Naka-gun; Takashi Nakamura, Hiratsuka; Hitoshi Watanabe, Yokohama; Satoshi Asada, Inagi, all of Japan

[73] Assignee: Canon Kabushiki Kaisha, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 516,561
[22] Filed: Aug. 18, 1995
[30] Foreign Application Priority Data Aug. 25, 1994 [JP] Japan .................... 6-200810

[51] Int. Cl.$^6$ ...................................... G06F 9/45
[52] U.S. Cl. ............................. 395/704; 395/703
[58] Field of Search .................... 395/701, 704, 395/183.13, 183.14, 182.22, 703

[56] References Cited

U.S. PATENT DOCUMENTS

| | | | |
|---|---|---|---|
| 5,048,018 | 9/1991 | Bernstein et al. | 395/704 |
| 5,210,859 | 5/1993 | Aoshima et al. | 395/183.22 |
| 5,369,746 | 11/1994 | Nakamura et al. | 395/200 |
| 5,418,919 | 5/1995 | Kadosawa et al. | 395/375 |
| 5,446,900 | 8/1995 | Kimelman | 395/704 |
| 5,475,843 | 12/1995 | Halviatti et al. | 395/704 |
| 5,481,717 | 1/1996 | Gaboury | 395/704 |
| 5,485,620 | 1/1996 | Sadre et al. | 395/710 |

Primary Examiner—Tariq R. Hafiz
Assistant Examiner—Peter J. Corcoran, III
Attorney, Agent, or Firm—Fitzpatrick, Cella, Harper & Scinto

[57] ABSTRACT

In editing a program, when a reference variable name of a predetermined program line is designated, a line variable i (its initial value is 1) and line information n are compared. If $i \geq n$, the processing is ended. If $i < n$, a check is made as to whether the line i is a variable definition area. If the line i is not the variable definition area, the line variable i is incremented and the process is repeated. If the line i is the variable definition area, the line i is searched for the reference variable name. If the reference variable name is not found, the line variable i is incremented and then the process is repeated. If the reference variable name is found, the line information and the text information are stored in an INSERT buffer 23-5. The pieces of information are stored in a variable definition table 51 in an order of reception. Finally, the variable definition statement stored in the variable definition table 51 is displayed.

8 Claims, 6 Drawing Sheets

FIG. 3

| LINE TABLE | TEXT TABLE |
|---|---|
| 1 | |
| 2 | |
| 3 | int a; |
| n-m | char a , b ; |
| n-1 | |
| n | a = b + 2 ; |

FIG. 5

| LINE TABLE | TEXT TABLE |
|---|---|
| 3 | int a; |
| n-m | char a , b |
|  |  |

PROGRAM PROCESSING TO FACILITATE PROGRAM EDITING

BACKGROUND OF THE INVENTION

The present invention relates to a program display method and apparatus for creating/editing computer programs.

In a program text described by a program language, such as C, in which descriptions of variable definition and variable reference are separated, the description of variable definition is often present in a physically remote area. Consequently, to confirm the contents of the definition, it is necessary to use scroll function or the like of an editing unit.

Unfortunately, in the above conventional technique, rapid movement from the variable reference area to the variable definition area is difficult, and this results in decreases in bug detection work efficiencies in programming and debugging.

SUMMARY OF THE INVENTION

The present invention has been made in consideration of the above conventional problem and has as its object to provide a program display method and apparatus for efficiently performing programming and editing.

The foregoing object is attained by the program display method and apparatus comprising: a program display method of displaying a program described by a programming language, comprising a program line designating step of designating a program line in which a variable name is to be referred to; a variable name designating step of designating a variable name described in the program line designated in the program line designating step; and a search/display step of searching a variable name definition line in which a type of the variable name designated in the variable name designating step is defined, and displaying the type corresponding to the designated variable name on display means.

Further, the foregoing object is attained by the program display method and apparatus comprising: a program display apparatus for displaying a program described by a program language, comprising program line designating means for designating a program line in which a variable name is to be referred to; variable name designating means for designating a variable name described in the program line designated by said program line designating means; and search/display means for searching a variable name definition line in which a type of the variable name designated by said variable name designating means is defined, and displaying the type corresponding to the designated variable name on display means.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate an embodiment of the invention and, together with the description, serve to explain the principles of the invention.

FIG. 3 is a view showing an edit table used in the edit/display processing of the embodiment;

FIG. 5 is a view showing a variable definition table used in the display processing of the embodiment.

DESCRIPTION OF THE PREFERRED EMBODIMENTS

The feature of a program display method and apparatus of the present invention is to increase the processing efficiencies in programming and debugging by facilitating displaying the definition contents of variable at the position of the variable reference.

This is accomplished by a method in which the user enters a simple command at a position where a variable is used and the definition of the variable are immediately displayed at that position.

The first embodiment of the present invention will be described below with reference to the accompanying drawings.

Figure 2:
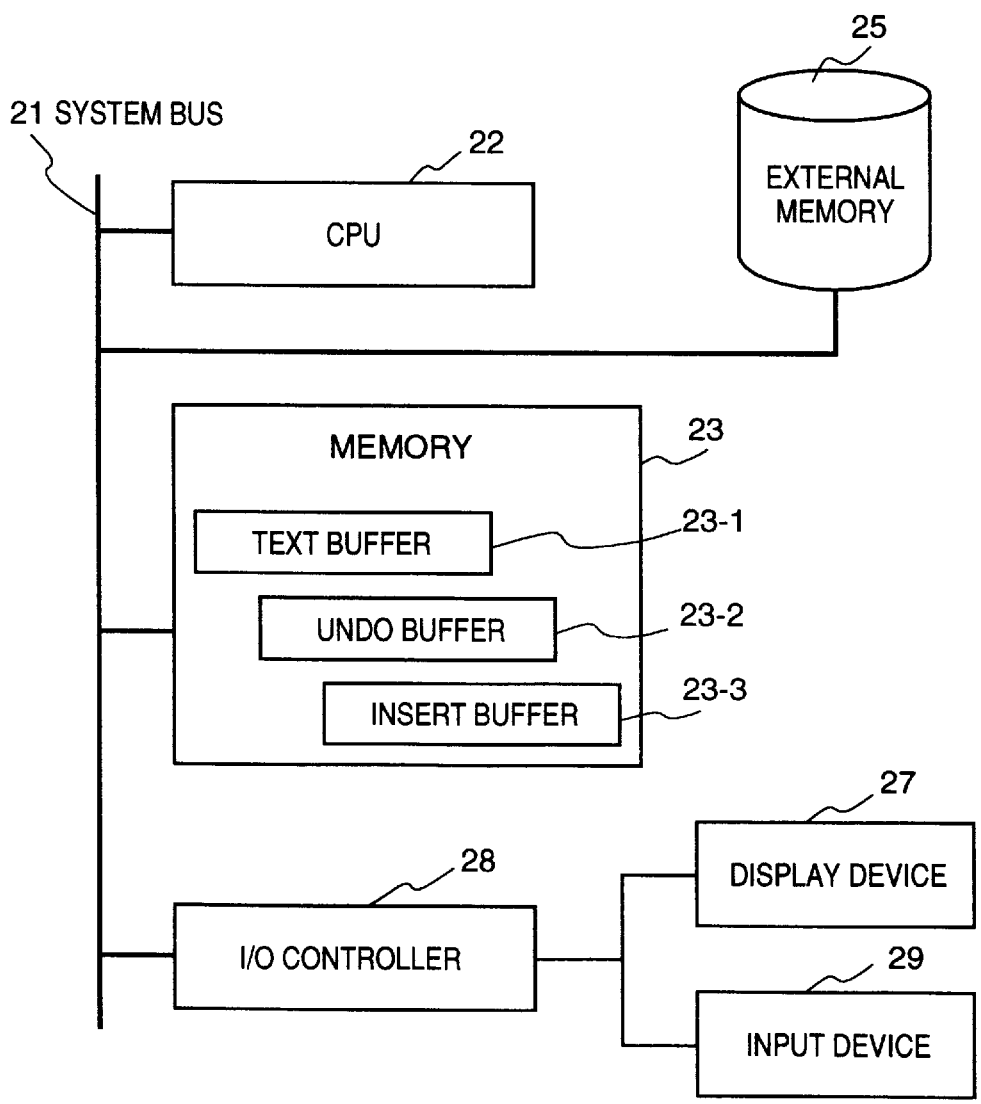
FIG. 2 is a block diagram showing a practical example of the arrangement of the program display apparatus of the embodiment.

FIG. 2 shows a practical example of the arrangement of a program display apparatus of this embodiment. This apparatus includes an input device 29 such as a keyboard, a display device 27 for displaying edited results and the like, an I/O controller 28 for controlling input and output actions, a main memory (Memory) 23 for storing editing/display programs and various data, an external memory 25 as a secondary storage unit, a central processing unit (CPU) 22 for controlling the overall apparatus, and a system bus 21 for transferring data between these components.

Figure 1:
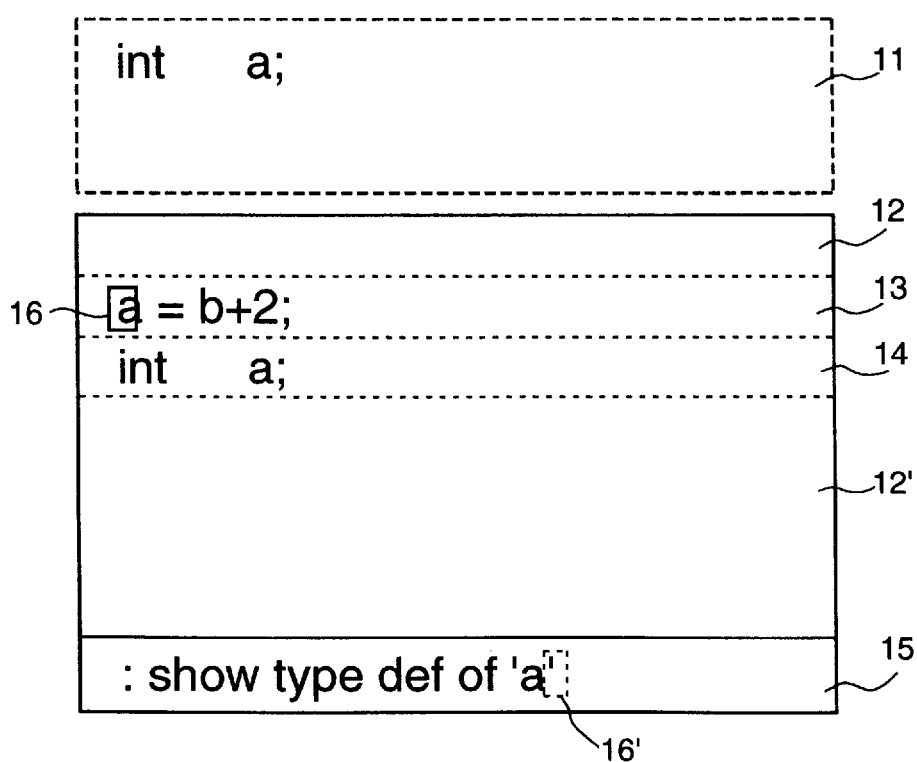
FIG. 1 is a view showing the contents displayed by a program display apparatus according to the embodiment of the present invention.

FIG. 1 shows an example of editing using the display device 27. FIG. 1 illustrates a variable definition area 11, editing areas 12 and 12', a variable reference line 13, a variable definition line 14, and a command input area 15. In program editing, with created program steps displayed on the display device 27, an operator designates a position to be edited on the screen from the input device 29 and enters edit commands and edit data from the input device 29, thereby performing the corresponding edit processing. The result is displayed on the screen of the display device 27. The program editing is implemented by repeatedly performing these process steps.

Figure 3:
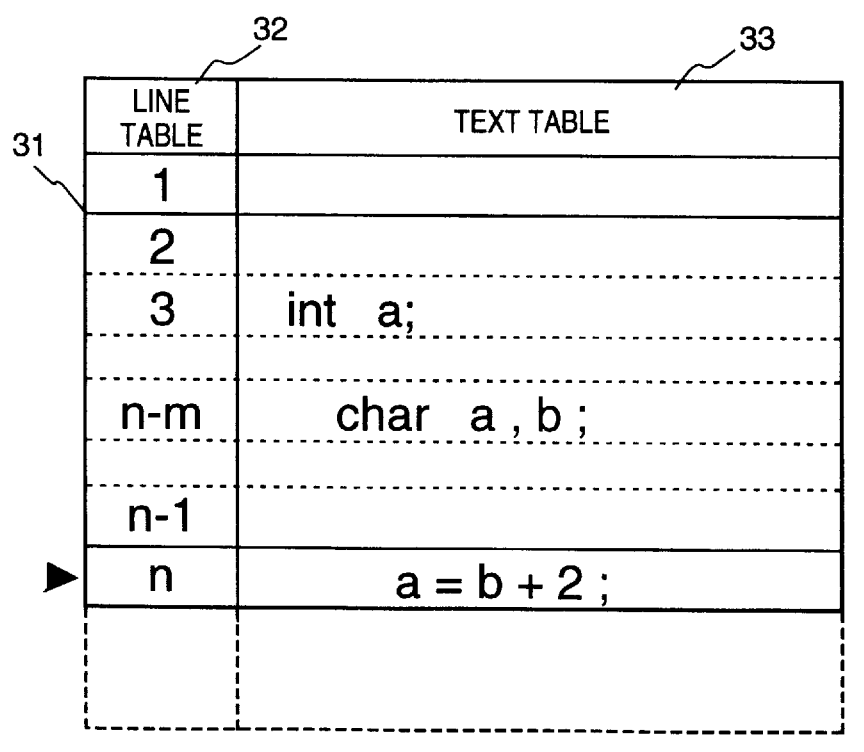

The program display device of this embodiment has two modes, i.e., an edit mode and a command input mode. The cursor (16 or 16') moves in the editing area 12 or the command input area 15 in accordance with the designated mode. Input information (from the input device 29) to the editing area 12 is stored in a TEXT buffer 23-1 of the main memory 23 via the I/O controller 28. The TEXT buffer 23-1 stores the information in the form of an edit table 31 (FIG. 3) which includes a line table 32 and a corresponding text table 33. The line table 32 stores program text line numbers, and the text table 33 stores program texts.

Assuming a variable 'a' is used in the editing area 12, procedures of referring to the definition contents of this variable 'a' will be described below. The contents of a file currently being edited are held in the TEXT buffer 23-1 in the form of the text table 33 and the corresponding line table 32.

By using the input device 29, the user moves the cursor to the position of the variable in the line 13 to be referred to in the editing area 12, and inputs a command for switching the mode to the command input mode.

Note that the program editing/display programs for performing the program editing and display of this embodiment are stored in the main memory 23 in advance.

In accordance with the input command, the CPU 22 switches the mode to the command input mode.

The contents of the TEXT buffer 23-1 at that time are held in an UNDO buffer 23-2, and the variable designation line 13 is stored as the n-th line in the line table 32.

When the user enters a command, e.g., show type def of 'a' in the command input area 15 from the input device 29, the CPU 22 receives and interprets this command and sets "a" as a variable to be referred to. On the basis of the line information a and the character string variable "a" (see "n-m" line in FIG. 3), the CPU 22 creates a variable definition table (FIG. 5) which includes the variable "a", in an INSERT buffer 23-3, by referring to the edit table shown in FIG. 3. These process procedures will be described below with reference to the flow chart in FIG. 4.

In step S41, the CPU 22 gives 0 as an initial value to a line variable i.

In step S42, the CPU 22 increments the value of the line variable i.

In step S43, the CPU 22 compares the line variable i with the line information n. If i<n, the flow advances to step S44. If i≧n, the CPU 22 ends the processing.

In step S44, the CPU 22 checks whether the line i in the edit table 31 (FIG. 3) is a variable definition area. If the line i is not the variable definition area, the flow returns to step S42. If the line i is the variable definition area, the flow advances to step S45.

In step S45, the CPU 22 searches for the reference variable "a" in the line i. If "a" is not found, the flow returns to step S42. If "a" is found, the flow advances to step S46.

Figure 5:
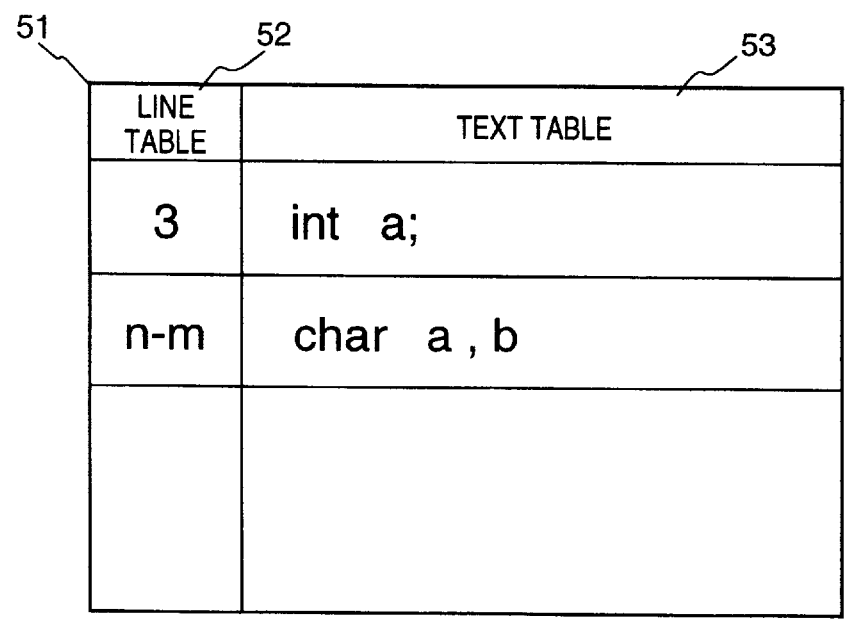

In step S46, the CPU 22 stores the line information and the text information in the form of the variable definition table 51, FIG. 5, in the INSERT buffer 23-3. Note that the pieces of information are stored in the variable definition table 51 in an order of reception, i.e., by sequentially incrementing the reference address to the variable definition table 51. The flow then returns to step S42, and the CPU 22 repeats similar process steps for the next line.

After the series of process steps described above, the CPU 22 inserts the contents of the variable definition table 51 of the INSERT buffer 23-3 immediately after the n-th line of the TEXT buffer 31, and displays the contents of the TEXT buffer thus changed on the display device 27. At the same time, the CPU 22 returns the cursor to the text edit mode. FIG. 1 shows the display screen of the display device at that time. Referring to FIG. 1, a variable definition line displayed in an area enclosed by the dotted lines is the retrieval result pertaining to the variable "a".

The contents of the TEXT buffer 31 before the change are stored in the UNDO buffer 23-2 of the memory 23. Therefore, the state shown in FIG. 1 can be returned by the UNDO function to the state (FIG. 5) before the variable definition contents are inserted.

(Second Embodiment)

In a processing method of the second embodiment, the variable definition reference processing in the first embodiment is further improved in consideration of the scope of a variable. Assume that a program language which can separate descriptions of variable definition and variable reference as objects to be processed by this embodiment and which can describe a block structure defining a "scope", which is an effective range of a variable, will be called L0 hereinafter. Also assume that a rule "any two given blocks are independent of each other, or one of the blocks contains the other"

is established for the block structure of the program language L0.

Figure 6:
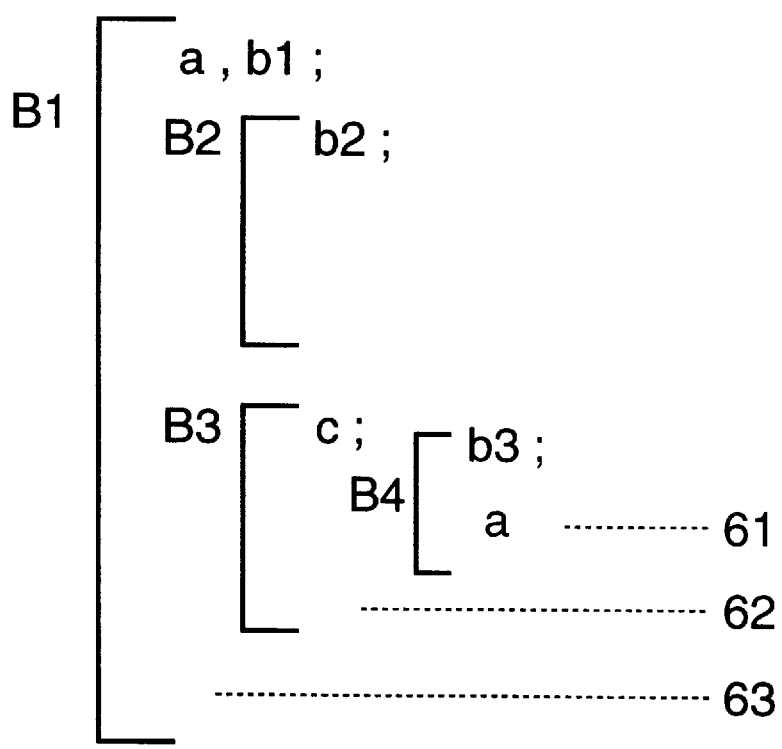
FIG. 6 is a view showing the concept of a block nesting structure of a certain program.

FIG. 6 shows a "nesting structure" of blocks. In a line 61 in a block B4 where a variable a is used, the mode is switched to the command input mode. Assume the command show type def of 'a' is entered as in the first embodiment. In accordance with this command, the CPU 22 sets "a" as a variable to be referred to. The CPU 22 then searches a variable definition containing the variable "a", in units of blocks, from the inner block B4 containing the designated line 61 toward the outer blocks (that is, B4→B3→B1), in accordance with the flow chart in FIG. 4. This search is commenced from the first line of each block, and, if the variable definition table 51 is empty at the end of the search, a similar search is executed for the outer block. The entire reference processing is completed when search for the outermost block is finished. Since the rule "any two given blocks are independent of each other, or one of the blocks contains the other"

is established for the block structure of the program language L0, the retrieval order is B4→(difference area: "B3–B4")→(difference area: "B1–B3") in the program structure in FIG. 6. That is, the search is performed only in the blocks containing the block where the variable is used and a block once searched earlier is excluded from the next search. The contents of the variable definition table 51 formed by the search are inserted immediately after the n-th line of the TEXT buffer 23-1, and the contents of the TEXT buffer thus changed are displayed on the display device 27. Simultaneously, the cursor is returned to the text edit mode. This state is illustrated in FIG. 1.

In the above embodiments, it is assumed that the variable definition area and the variable reference area are present in the same file. However, the processing can be similarly performed as in the above embodiments even if the variable definition area and the variable reference area are present in different files. For example, when the variable definition is described in another file such as xyz.h, the user declares in a file as an object of variable reference that the variable declaration is done in xyz.h. That is, the user describes a line state such as include "xyz.h"

in the file as an object of variable reference, clearly indicating that xyz.h is contained in the file as an object of variable reference. Even in such cases, the xyz.h file can be searched similarly as in the above embodiments, and the state shown in FIG. 1 can be obtained.

According to the present invention as described above, programming and editing can be efficiently performed.

In the above embodiments, only a definition line of the designated variable name is searched and displayed. However, it is also possible to search variables contained in an executable statement which contains the designated variable and display the corresponding variable name definition statements.

Figure 4:
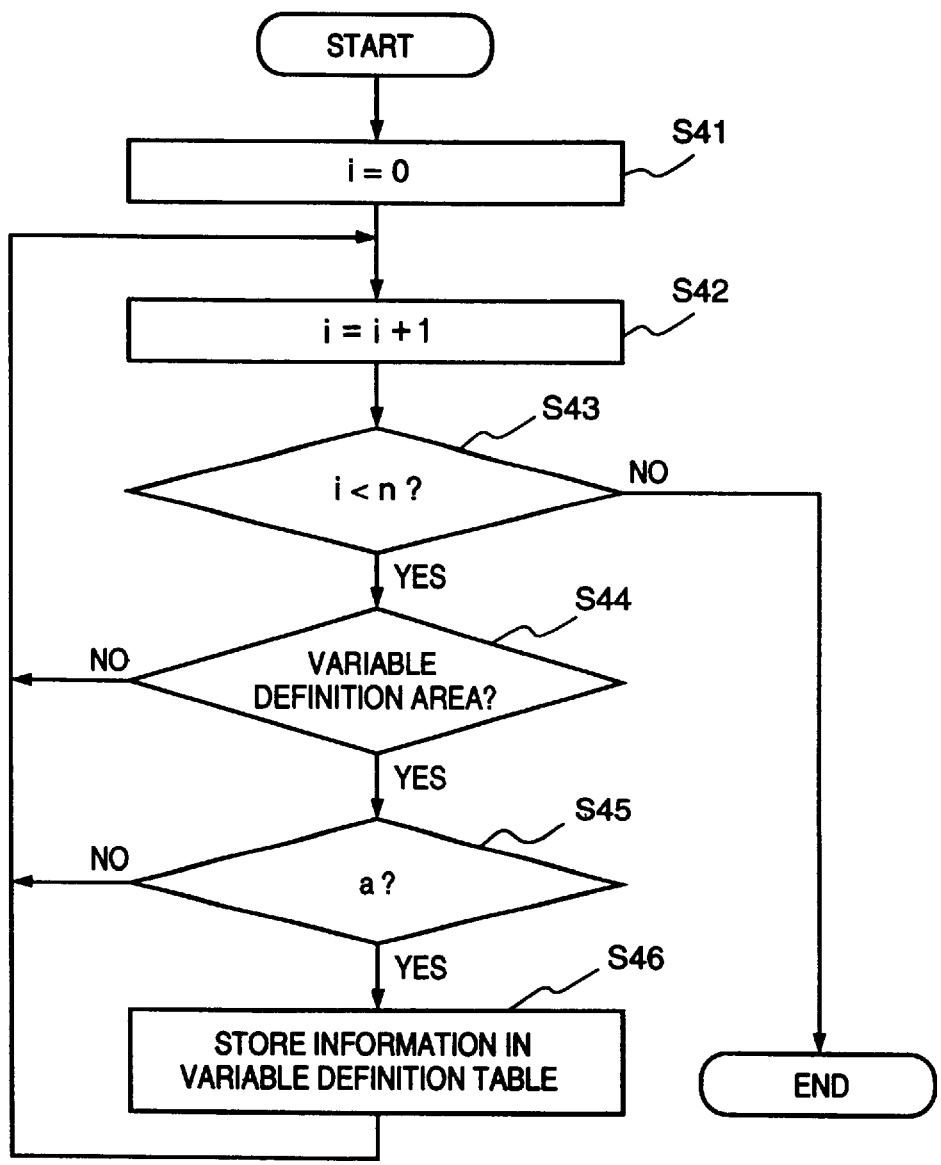
FIG. 4 is a flow chart of the edit processing of the embodiment.

In this case, in step S45 of FIG. 4, it is only necessary to search simultaneously the designated variable "a" and variables contained in an executable statement which contains the designated variable.

The search result can be additionally displayed in the area 11 in FIG. 1.

For example, if the variable name "a" in the line 13 in FIG. 1 is designated, a variable name "b" in the same line is simultaneously searched and the search result is displayed in the area 11.

The present invention can be applied to a system constituted by a plurality of devices or to an apparatus comprising a single device.

Furthermore, the invention is applicable also to case where the invention is embodied by supplying a program to a system or apparatus. In this case, a storage medium, storing a program according to the invention constitutes the invention. The system or apparatus installed with the program read from the medium realizes the functions according to the invention.

As many apparently widely different embodiments of the present invention can be made without departing from the spirit and scope thereof, it is to be understood that the invention is not limited to the specific embodiments thereof except as defined in the appended claims.

What is claimed is:

1. A program processing method of processing a program described by a programming language, comprising:
    an input step of inputting a program which consists of a plurality of program lines including a plurality of variable name definition lines;
    a first display step of displaying the program inputted in said input step on a display;
    a pointing step of pointing to a program line on the display;
    a designating step of designating a variable name described in the program line pointed to in said pointing step;
    a search step of searching the plurality of variable name definition lines above the program line pointed to in said pointing step for a variable name definition line in which a type of the variable name designated in said designating step is defined; and
    a second display step of displaying the type defined in the variable name definition line searched out in said searching step near the program line pointed to in said pointing step on the display.

2. The method according to claim 1, wherein the programming language can be described with the variable name definition line and the program line containing the variable name away from each other.

3. The method according to claim 1, wherein said search step includes a step of searching the variable name definition line defining the designated variable name above the program line pointed to in said pointing step from a program block scope containing the program line pointed to in the pointing step toward upper program block scopes, and in said second display step, a type in the firstly found variable name definition line defining the designated variable name is displayed near the program line pointed to in said pointing step on the display.

4. The method according to claim 1, wherein said search step includes a step of searching a variable name definition line which defines a type of another variable name contained in the program line containing the designated variable name above the program line pointed to in said pointing step, and in said second display step, the type in the variable name definition line defining the another variable name is displayed near the program line pointed to in said pointing step on the display.

5. A program processing apparatus for processing a program described by a program language, comprising:
    input means for inputting a program which consists of a plurality of program lines including a plurality of variable name definition lines;
    first display means for displaying the program inputted in said input means on a display;
    program line pointing means for pointing to a program line in which a variable name is to be referred to;
    variable name designating means for designating a variable name described in the program line pointed by said program line pointing means;
    search means for searching the plurality of variable name definition lines above the program line pointed to by said pointing means for a variable name definition line in which a type of the variable name designated by said variable name designating means is defined; and
    second display means for displaying the type defined in the variable name definition line searched out by said search means near the program line pointed to by said pointing means.

6. The apparatus according to claim 5, wherein the programming language can be described with the varible name definition line and the program line containing the variable name away from each other.

7. The apparatus according to claim 5, wherein said search means searches the variable definition name line defining the designated the variable name above the program lie pointed to by said pointing means from a program block scope containing the program line pointed to by said program line pointing means toward upper program block scopes, and said second display means displays a type in the firstly found variable name definition line defining the variable name near the program line pointed to by said pointing means.

8. The apparatus according to claim 5, wherein said search means searches a variable name definition line which defines a type of another variable contained in the program line containing the variable name designated by said variable name designating means, above the program lie pointed to by said pointing means, and said display means displays the type defining the other variable name near the program line pointed to by said pointing means.

* * * * *

UNITED STATES PATENT AND TRADEMARK OFFICE
CERTIFICATE OF CORRECTION

PATENT NO. : 5,887,173
DATED : March 23, 1999
INVENTOR(S) : YASUYUKI OGAWA ET AL.

It is certified that error appears in the above-identified patent and that said Letters Patent is hereby corrected as shown below:

COLUMN 1

Line 12, "use" should read --use the--.

COLUMN 3

Line 13, "a" should read --n--.

COLUMN 6

Line 5, "the" should be deleted.
Line 37, "lie" should read --line--.
Line 49, "lie" should read --line--.

Signed and Sealed this

Twenty-eighth Day of September, 1999

Attest:

Q. TODD DICKINSON

*Attesting Officer*    *Acting Commissioner of Patents and Trademarks*